June 1, 1965

J. L. NEIL 3,186,393

FUEL INJECTION VALVE CAGE FOR GAS BURNING
INTERNAL COMBUSTION ENGINES AND ENGINE
AND FUEL SYSTEM EMPLOYING SAME

Filed April 30, 1962

Joseph L. Neil
INVENTOR.

BY Browning, Simms
Hyer & Eickenroht

ATTORNEYS

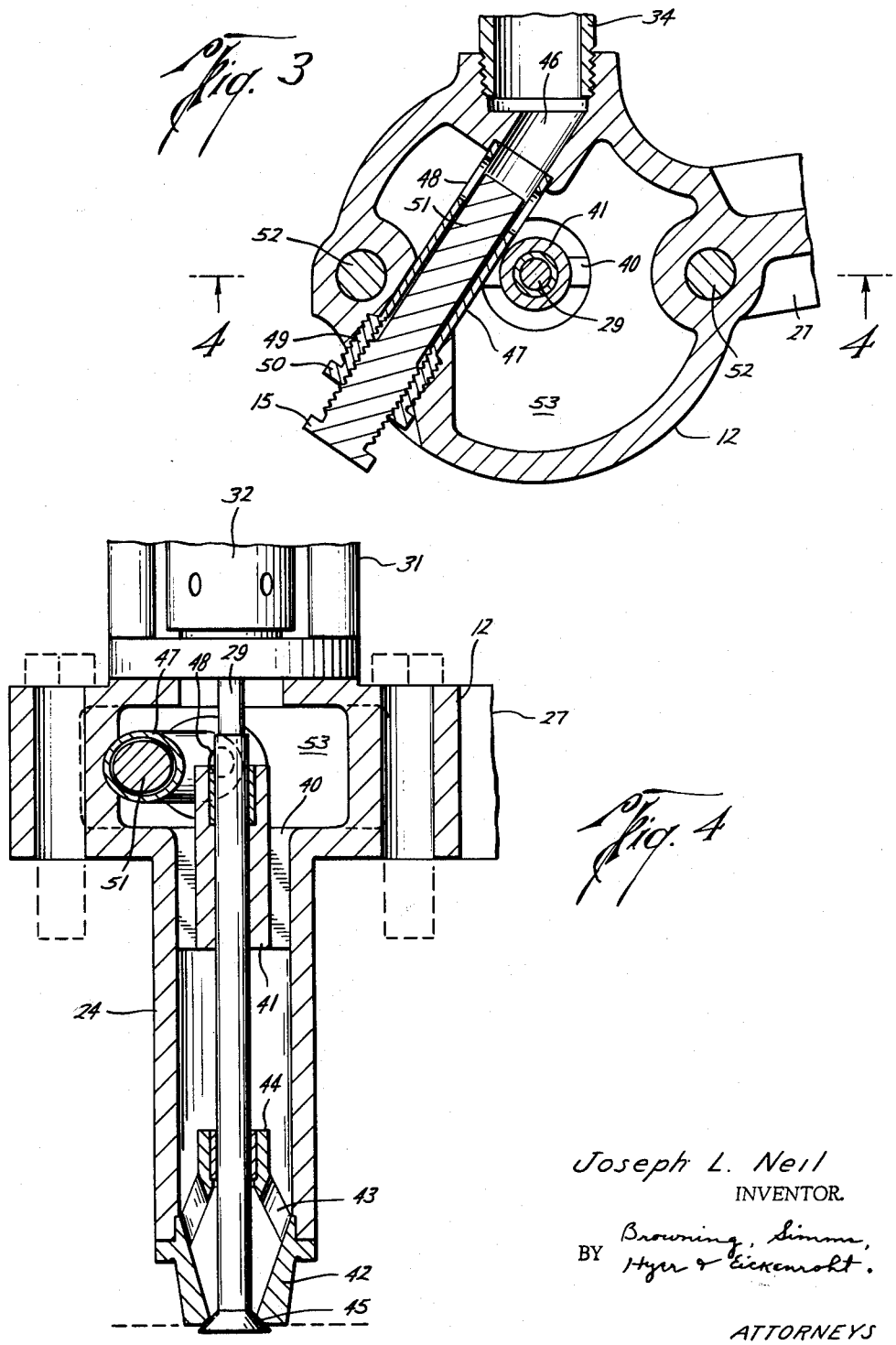

United States Patent Office 3,186,393
Patented June 1, 1965

3,186,393
FUEL INJECTION VALVE CAGE FOR GAS BURNING INTERNAL COMBUSTION ENGINES AND ENGINE AND FUEL SYSTEM EMPLOYING SAME
Joseph L. Neil, Pampa, Tex., assignor to Panhandle Industrial Company, Pampa, Tex., a corporation of Delaware
Filed Apr. 30, 1962, Ser. No. 190,948
7 Claims. (Cl. 123—120)

This invention relates in general to a means for supplying gaseous fuel to internal combustion engines. In its primary aspect it has to do with a fuel injection valve cage adapted to serve as the valve cage for the fuel intake valve of an engine cylinder and to provide a substantial volume of fuel immediately adjacent the intake valve. Other aspects involve the use of such a valve cage in an engine in which its parts bear certain relationships to the engine making for more advantageous operation thereof, and a fuel supply system for a plurality of engines embodying such valve cages in which the relationships are such as to make for better operation of all the engines under varying operating conditions.

In the past engines operating on gaseous fuel have required extremely careful adjustment of the pressure of the fuel supply and maintenance of the same at a constant value as well as careful adjustment of each tappet of each inlet valve in order to provide for smooth operation. Rebalancing of an engine was required through extensive adjustment of tappets each time a change in pressure of the fuel supply occurred, such as resulting from governor operation or the like, and a sudden shutting down of one engine of a group supplied by a common fuel system would greatly disturb the operation of the other engines of the same group and require extensive adjustment thereof to balance them for operation without the engine which had shut down.

The general object of this invention is to provide a fuel valve cage which will provide for a better cage per se as well as for improved operating characteristics of engines employing such cages and of systems of fuel supply to engines employing such cages. More specifically, it is an object of this invention to provide a valve cage which will make possible quick adjustment of fuel flow to a single cylinder and limit the same without unduly reducing the minimum pressure of fuel at the intake valve of such cylinder due to throttling.

Another object is to provide a valve cage which will greatly reduce difference between the maximum and minimum fuel pressure available at the inlet valve of an engine cylinder to force fuel into the combustion chamber during a single opening of the inlet valve.

Another object of this invention is to provide an engine in which the fuel supply to each cylinder may be readily adjusted without necessity for disturbing valve tappet adjustment and the balancing of an engine greatly facilitated.

Another object is to provide a fuel supply system for a plurality of engines which will avoid the ill effects of sudden changes in pressure of fuel supply due to such circumstances as sudden partial shut-downs or start-ups in a system of several engines with a common fuel supply, and in which the engines may be quickly balanced for simultaneous operation.

Other objects and advantages of this invention will become apparent from the following description taken in connection with the accompanying drawings wherein is set forth by way of illustration and example one embodiment of the fuel valve cage of this invention, of an engine embodying the same, and of a fuel supply system for a number of engines employing such valve cage.

In the drawings:

FIG. 3 is a transverse cross section through the volume chamber of the valve cage of this invention showing in longitudinal cross section therein a means for metering the flow of fuel into the valve cage volume chamber.

FIG. 4 is a longitudinal cross section through the valve cage of FIG. 3 taken on the line 4—4 thereof.

Figures 1, 2:
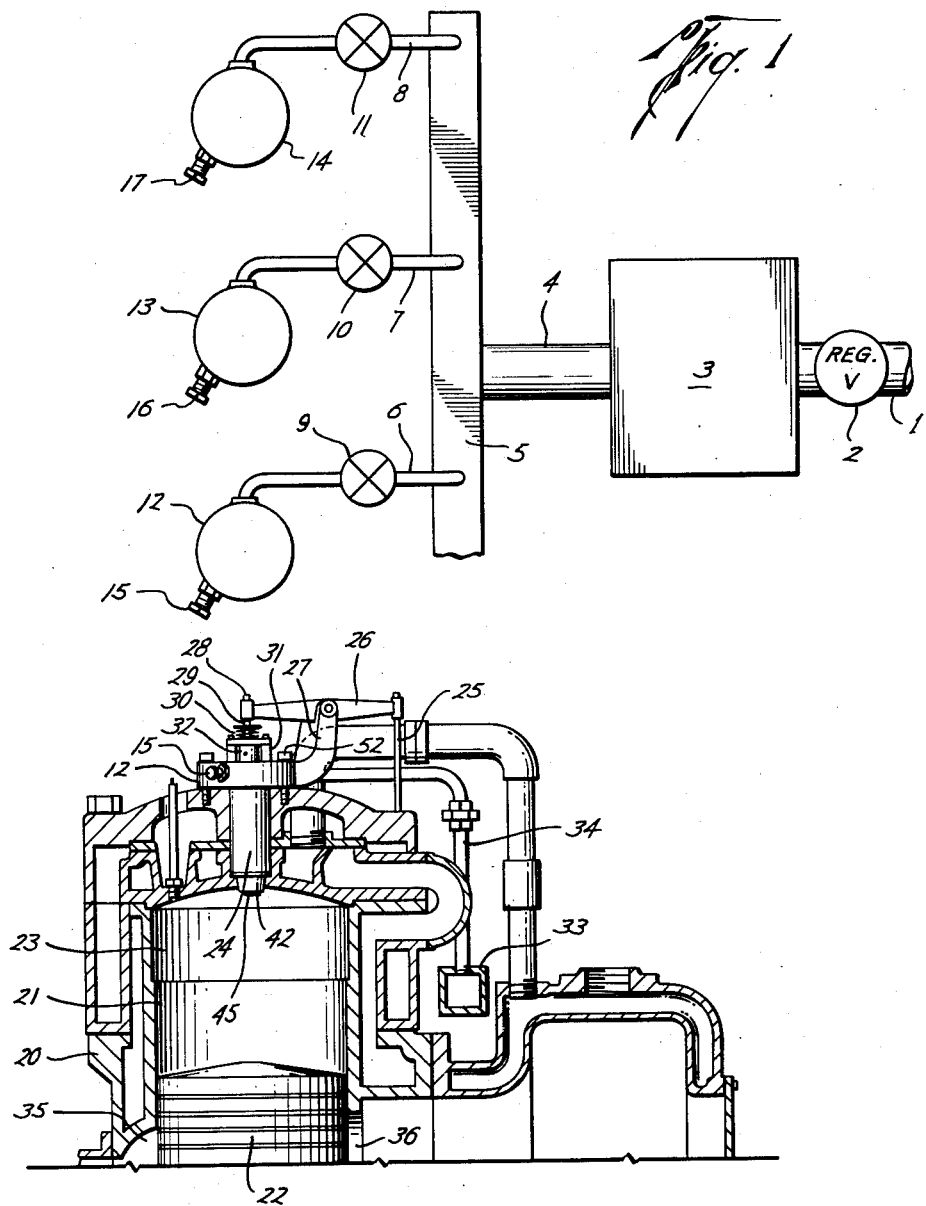
FIG. 1 is a diagrammatic view illustrating a fuel supply system for a group of several engines each employing a valve cage constructed in accordance with this invention, the engines in this illustration each being indicated by a single valve cage.
FIG. 2 is a fragmentary view through the upper portion of an engine cylinder having the valve cage of this invention installed therein, showing a vertical cross section of the cylinder and associated parts.

In the form depicted in the drawings, the objects of this invention are achieved by providing a valve cage within which is formed a metered volume fuel chamber having a volume constituting a substantial portion of the volume of fuel required for a single charge for the combustion chamber of an engine with which the valve cage is to be employed. In its broadest aspects the exact volume of this volume chamber is not critcial, it being merely desired to provide at a point immediately available to the intake valve a substantial portion of the requirements of the fuel charge for the cylinder for a given cycle. This serves to minimize the effects of any rapid changes in the pressure of the fuel supply or any sudden throttling thereof as by extremely fast governor operation and tends to prevent such erratic operation as "hunting."

In addition, it is provided that the flow of fuel into this volume chamber be metered by an adjustable metering device capable of very quick and accurate adjustment so as to regulate the rate of flow of fuel into the volume chamber. This rate of flow preferably should be so adjusted that the volume chamber will become filled at a fairly constant flow rate of fuel during the time the intake valve of the engine is closed and so that the amount of fuel necessary to supplement that contained in the volume chamber in order to provide the single charge for the cylinder will readily flow through the metered entrance to the volume chamber during the period that the valve is open. Thus the intake to the volume chamber, although adjustable, remains open continuously throughout the engine cycle. An optimum size for the volume chamber is in the neighborhood of two-thirds of the volume that would be required to hold a complete fuel charge for a single cycle of operation.

By so sizing the volume chamber and providing the adjustable fuel metering means for admission of fuel to the volume chamber with respect to a particular engine on which it is mounted, extremely rapid adjustment of the fuel supply to any given cylinder of such an engine may be provided and the engine itself may be very quickly balanced as between its own cylinders as well as against other engines that may be supplied by the same fuel system.

By providing all of the engines of a given group supplied by a single fuel system with metered volume valve cages in accordance with this invention, the effects of shut-down of one of the engines due to breakdown or for any other reason or the effects of fluctuation of load causing opening and closing of governor throttle valve will be absorbed by the various engines of the system with the least possible "hunting" and interference of one engine with another due to the modification of the fuel supply by changes in the operation of one or more engines. Also, in such a system it is possible to readily balance the engines one against another so that all will run satisfactorily under a predetermined set of conditions and to do this much more readily than is possible by tappet adjustment as has been customary in the past.

Referring more specifically to the drawings and to the diagrammatic illustration of a system employing this invention as shown in FIG. 1, the numeral 1 designates a main fuel supply pipe adapted to supply fuel through a regulator valve 2 to a reservoir 3 which serves as a surge chamber for a number of engines operating from this fuel supply.

The fuel from this reservoir or surge chamber 3 flows through a suitable conductor 4 to a header 5 from which the fuel supplies for the respective engines are taken. Indicated in this figure are three engines whose fuel supplies are passed through fuel supply pipes 6, 7 and 8 and engine controlling throttling valves 9, 10 and 11 therein. These throttling valves 9, 10 and 11 in many installations will be controlled by governors usually designated to maintain constant engine speed under varying load conditions. The fuel supply lines downstream from the valves 9, 10 and 11 are shown as connected to valve cages 12, 13, and 14 constructed in accordance with this invention. It will be understood that each of these valve cages will be secured to a cylinder of a separate engine and that instead of one valve cage and one cylinder of each engine, each engine may have a plurality of cylinders and a plurality of valve cages, this being the usual arrangement.

The exterior adjustment of flow of fuel into each valve cage is regulated by a metering pin or valve which are shown as 15, 16 and 17, respectively, in FIG. 1.

It will be seen by reference to FIG. 1 that if it should become necessary to shut down one of the engines such as that to which the valve cage 12 is mounted, or to greatly reduce the flow of fuel thereto because of sudden reduction in its load, the natural result would be a momentary increase in pressure within the header 5 and hence of the pressure of fuel supplied to the other two engines. This would naturally tend to cause surging of the other two engines. For reasons hereinafter to be explained, however, the volume chamber and metering pin provided on the valve cages 13 and 14 of the other two engines would minimize the surging of fuel into those engines and hence the uneven operation which otherwise would result therefrom. The metering pins would tend to prevent extra surges of fuel into the valve cages while the existence of the relatively large volume of fuel within each valve cage would tend to minimize the effect of any surge of fuel into such volume chamber, with the over-all result of smoother operation of the engine in each case with less tendency to surge.

FIG. 2 shows more in detail the cylinder and associated parts of an engine to which it will be considered the valve cage 12 of FIG. 1 is secured. This engine is shown as consisting of a block 20 having a cylinder 21 therein with a piston 22 reciprocably mounted in the cylinder in the conventional manner. In the upper end of the cylinder 21 is a space providing a compression and firing chamber 23 closed at its upper end by a cylinder head. Mounted in this cylinder head likewise in conventional fashion is a valve cage which in the present instance is constructed in accordance with this invention instead of being of the conventional character of such valve cages. It is shown at 24 and opens at its lower end into the combustion chamber 23. It will presently be explained in more detail.

The conventional pushrod 25 extending upwardly from the cam shaft (not shown) and operated thereby is intended to reciprocate a rocker arm 26 pivotally mounted intermediate its ends on a rocker arm support 27 which in the present instance is integral with the valve cage. At the opposite end of this rocker arm is an adjustable tappet 28 adapted to bear against a valve stem 29 constantly biased in an upward direction by a valve spring 30. The valve spring 30 rests on a packing gland support 31 carrying a packing gland 32 through which the valve stem 29 extends into the interior of valve cage 24. The packing gland support 31 is suitably secured to the top surface of the valve cage over the valve stem opening therein so as to provide a seal about the valve stem.

Also illustrated in FIG. 2 is a transverse cross section through the fuel manifold 33 supplying fuel to the cylinder illustrated, the same being connected by means of a fuel line 34 to the fuel valve cage 24.

In the instance illustrated the engine cylinder is adapted to operate on the two-stroke or two-cycle principle and to receive combustion air through an intake opening 35 when the piston is in its lower position and discharge the exhaust gases through an opening 36.

Referring now to FIGS. 3 and 4, the details of the intake valve cage and metered volume chamber are set out in more detail.

Inside the body 24 of the valve cage which extends through the cylinder head, it will be seen that there are provided radially extending supports 40 for guide bearings 41 and at the inner end of the body is provided a valve seat insert 42 which likewise has radially extending supports 43 for a second and lower valve stem guide or bearing 44. On the lower end of the valve stem 29 is a poppet type valve 45 adapted to seat against the valve seat provided on the lower end of the valve seat insert 42 and to be moved downwardly by downward movement of the valve stem 29 to open the valve and upwardly by the valve spring 30 to close the valve.

The fuel supply pipe 34 is connected as illustrated in FIG. 3 so as to introduce the fuel through a passageway 46 into a tubular flow metering body 47 seated at its inner end in a seat provided surrounding the passageway 46 and held against such seat and in its position in the body by means of a threaded portion 49 adjacent its opposite end threaded into a tapped opening in the valve cage body. This metering body is adapted to be tightened into position by suitable means such as a hex head 50 on its outer end. Adjacent its seated end it is provided with one or more lateral openings 48 through which fuel which enters this body from the passageway 46 may pass laterally into the valve cage proper.

The lateral flow of fuel through the openings 48 is controlled by a metering pin 51 adjustably mounted inside of the metering body by means of threads on the exterior of the pin engaging with interior threads in the metering body. It may be adjusted by the head on its outer end as illustrated so as to permit any desired adjustment of flow of fuel into the valve cage. The cage is uninterrupted by lateral openings between the fuel intake openings 48 and the fuel inlet valve 45 which controls flow from the cage to the combustion chamber 23.

The valve cage may be held in place on the cylinder head by any suitable means such as cap screws or studs 52.

The novel features of this valve cage as compared with previous valve cages lie in the metering means just described for admitting fuel from the fuel line 34 into the valve cage and for readily adjusting such fuel flow to any extent desired, and also in the provision within the valve cage of a very considerable volume indicated by the numeral 53 adapted to receive and contain at all times a substantial amount of fuel so that variations in rate of flow past the metering means due to sudden fluctuations in supply pressure of fuel will have less effect on the amount of fuel supplied at a given charge to the engine than would otherwise be the case. Furthermore, by so sizing this volume with respect to the engine with which it is to be used that the volume constitutes in the neighborhood of two-thirds of the volume of fuel required for a single charge of the engine cylinder, the pressure of fuel at the time of opening of the valve need not be as high as otherwise would be required in order to supply fuel to the cylinder at the desired rate because this pressure due to the volume of fuel present in the volume chamber will not drop off rapidly during the opening of the valve.

By supplementing this with a metered flow into the volume chamber sufficient to supply the remainder of the requirement for a single charge into the cylinder, a very uniform flow of fuel into the cylinder will be provided even under conditions of considerable fluctuation of pressure, and the use of high fuel pressures will be avoided while the occurrence of accidentally low fuel pressures will not have the adverse effects otherwise to be expected.

In the case of multicylinder engines equipped with valve cages of the character described the various cylinders of the engine may be balanced one against the other without adjustment of the valve tappets and the leaving of excessive clearances in the valve operating linkage. This not only provides faster adjustment and balancing of the cylinders of a single engine, but avoids the high wear conditions which would result from undesirably loose tappet adjustment. At the same time it provides a more accurate adjustment of the supply of fuel to each cylinder than would otherwise be possible.

In the case of a number of engines employing valve cages in accordance with this invention operated from a comon fuel supply, the effect is that of regulation of each engine at each cylinder in such fashion as to minimize the effect of shutting down or starting up one of the engines of the group which otherwise would require complete rebalancing of all the engines in order to make for normal and efficient operation. Surges of fuel with consequent "hunting" of the engines which otherwise occurs at partial loads or under other fluctuating conditions is largely prevented by this invention.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A fuel valve cage for a cylinder of an internal combustion engine comprising a body with a tubular conduit portion adapted to extend through a cylinder head and having a valve seat receiving surface on one end and a portion providing a metered volume fuel reservoir on its opposite end and uninterrupted therebetween, said last mentioned portion having a fuel inlet port with a continuously open fuel supply pipe connection to receive fuel therefrom and orifice means interposed in said port for controlling the rate of fuel flow therethrough.

2. A fuel valve cage for a cylinder of an internal combustion engine comprising a body with a tubular conduit portion adapted to extend through a cylinder head and having a valve seat receiving surface on one end and a portion providing a metered volume fuel reservoir on its opposite end and uninterrupted therebetween, said last mentioned portion having a fuel inlet port with a continuously open fuel supply pipe connection to receive fuel therefrom, orifice means interposed in said port for controlling the rate of fuel flow therethrough, and means for varying the effective size of said orifice means.

3. A fuel valve cage in accordance with claim 1 in which said orifice means includes means having a flow opening therein and a metering pin adjustably mounted relative to said opening to overlie said opening to a greater or lesser degree and regulate fuel flow therethrough.

4. A fuel valve cage in accordance with claim 3 in which said pin extends outside of said body for adjustment from the exterior of said body to vary the effective size of said orifice means.

5. In a piston and cylinder type gas burning internal combustion engine having a fuel supply conduit and an engine throttle controlling flow of fuel therethrough, each cylinder having a combustion chamber therein, a fuel inlet valve cage on each cylinder in communication with said fuel supply conduit and the combustion chamber of such cylinder and uninterrupted therebetween, and a fuel inlet valve controlling communication between the valve cage and the combustion chamber, the improvement which comprises a separate means for adjustably throttling fuel flow into each of said valve cages.

6. In a piston and cylinder type gas burning internal combustion engine having a fuel supply conduit and an engine throttle controlling flow of fuel therethrough, each cylinder having a combustion chamber therein, a fuel inlet valve cage on each cylinder in continuous communication with said fuel supply conduit and in discontinuous communication with the combustion chamber of such cylinder, and a fuel inlet valve controlling communication between the valve cage and the combustion chamber, the improvement which comprises each of said valve cages having an internal metered volume fuel chamber with a volume in excess of half of the volume of fuel required for a single charge to the combustion chamber.

7. In a piston and cylinder type gas burning internal combustion engine having a fuel supply conduit and an engine throttle controlling flow of fuel therethrough, each cylinder having a combustion chamber therein, a fuel inlet valve cage on each cylinder in continuous communication with said fuel supply conduit and in discontinuous communication with the combustion chamber of such cylinder, and a fuel inlet valve controlling communication between the valve cage and the combustion chamber, the improvement which comprises each of said valve cages having an internal metered volume fuel chamber with a volume in excess of half of the volume of fuel required for a single charge to the combustion chamber, and a separate means for adjustably throttling fuel flow into the chamber of each of said valve cages.

References Cited by the Examiner

UNITED STATES PATENTS

| 1,101,893 | 6/14 | West | 123—106 |
|---|---|---|---|
| 2,521,299 | 9/50 | Mallory | 60—97 |
| 2,799,255 | 7/57 | Gehres | 123—1 |
| 2,916,885 | 12/59 | Smith | 60—97 |
| 3,062,198 | 11/62 | Richardson | 123—1 |

FOREIGN PATENTS

| 697,779 | 10/40 | Germany. |
|---|---|---|
| 1,098,287 | 1/61 | Germany. |
| 482,806 | 4/38 | Great Britain. |

RICHARD B. WILKINSON, *Primary Examiner.*

ROBERT R. BUNEVICH, *Examiner.*